US005445866A

United States Patent [19]

Martinson et al.

[11] Patent Number: 5,445,866

[45] Date of Patent: Aug. 29, 1995

[54] WATER-BASED TRANSPARENT IMAGE RECORDING SHEET

[75] Inventors: Robert E. Martinson, West St. Paul; John J. Stofko, St. Paul, both of Minn.; Manisha Sarkar, Austin, Tex.; Steven T. Hedrick, Cottage Grove; Wayne K. Larson, Maplewood, both of Minn.

[73] Assignee: Minnesota Mining and Manufacturing Company, St. Paul, Minn.

[21] Appl. No.: 139,100

[22] Filed: Oct. 19, 1993

[51] Int. Cl.$^6$ .................................................. B32B 3/00

[52] U.S. Cl. .................................... 428/195; 428/206; 428/327; 428/447; 428/451; 428/480; 428/500; 428/688; 428/913

[58] Field of Search ............... 428/195, 206, 327, 518, 428/520, 688, 913, 914, 447, 451, 480, 500

[56] References Cited

U.S. PATENT DOCUMENTS

| | | | |
|---|---|---|---|
| 3,535,112 | 10/1970 | Dolce et al. | 96/1.4 |
| 3,539,340 | 11/1970 | Dolce et al. | 96/1.4 |
| 3,912,831 | 10/1975 | Kan et al. | 427/145 |
| 4,052,368 | 10/1977 | Larson | 260/75 S |
| 4,065,245 | 4/1978 | De Vito et al. | 428/215 |
| 4,071,362 | 1/1978 | Takemaka et al. | 96/1.4 |
| 4,177,175 | 12/1979 | Baney et al. | 260/29.2 M |
| 4,299,422 | 3/1981 | Davidson et al. | 430/17 |
| 4,480,003 | 10/1984 | Edwards et al. | 428/329 |
| 4,489,122 | 12/1984 | Kammin et al. | 428/212 |
| 4,684,561 | 8/1987 | Imai et al. | 428/141 |
| 4,686,549 | 8/1987 | Williams et al. | 503/227 |
| 4,690,959 | 9/1987 | Plueddemann | 523/213 |
| 4,724,004 | 2/1988 | Saito | 106/287 |
| 4,800,125 | 1/1989 | Plueddemann | 428/405 |
| 4,819,010 | 4/1989 | Kohashi et al. | 346/76 |
| 4,847,237 | 7/1989 | Vanderzanden | 503/227 |
| 4,869,955 | 8/1989 | Ashcraft et al. | 428/327 |
| 4,898,786 | 2/1990 | Swofford | 428/480 |
| 4,912,009 | 3/1990 | Amering et al. | 430/137 |
| 4,952,650 | 8/1990 | Young et al. | 526/194 |
| 4,956,223 | 9/1990 | Arai et al. | 428/212 |
| 5,022,944 | 6/1991 | Swofford et al. | 156/244.11 |
| 5,064,722 | 11/1991 | Swofford et al. | 428/447 |
| 5,104,731 | 4/1992 | Gager | 428/323 |
| 5,310,591 | 5/1994 | Dodge et al. | 428/195 |
| 5,310,595 | 5/1994 | Ali et al. | 428/206 |

FOREIGN PATENT DOCUMENTS

| | | |
|---|---|---|
| 0301827A2 | 2/1989 | European Pat. Off. . |
| 0349227A2 | 9/1990 | European Pat. Off. . |
| 0389200A2 | 9/1990 | European Pat. Off. . |
| 0408197A2 | 1/1991 | European Pat. Off. . |
| 0442567A2 | 8/1991 | European Pat. Off. . |
| 57-42741 | 3/1982 | Japan . |
| 1-289838 | 11/1989 | Japan . |

OTHER PUBLICATIONS

Chemical Abstract 120:272673, JP 04-175987, Jun. 11, 1992, Hirata et al.

*Primary Examiner*—Patrick J. Ryan
*Assistant Examiner*—William A. Krynski
*Attorney, Agent, or Firm*—Gary L. Griswold; Walter N. Kirn; Carolyn V. Peters

[57] ABSTRACT

A transparent recording sheet coated with a transparent water-based image-receptive coating composition of (1) from about 5 parts by weight to about 95 parts by weight of an oligomer incorporating at least one addition product having at least two reactants wherein one reactant is 3-glycidoxypropylalkoxysilane and the second reactant is at least one secondary amine; (2) from about 5 parts by weight to 95 parts by weight of a colloidal dispersion; (3) optionally, one or more anti-blocking agents; and (4) optionally, one or more surfactants.

16 Claims, No Drawings

WATER-BASED TRANSPARENT IMAGE RECORDING SHEET

FIELD OF THE INVENTION

This invention relates to transparent recording materials suitable for use in printers and copiers and particularly, to transparencies useful for overhead projectors.

BACKGROUND OF THE INVENTION

Many different types of transparencies are known in the art. They can be made by different printing and imaging methods, such as thermal transfer printing, ink-jet printing and plain paper copying, such as electrography and xerography. These transparencies are suitable for use with overhead projectors.

In the formation and development of xerographic images, a toner composition comprised of resin particles and pigment particles is generally applied to a latent image generated on a photoconductive element. Thereafter, the image is transferred to a suitable substrate, such as a transparent receiving sheet, and affixed there by the application of heat, pressure, or a combination thereof.

It is also known that transparencies can be selected as a receptor for thermal mass transferred images originating from thermal printing devices. Typically, these transparent sheets are comprised of thin films of one or more organic resins, such as polyesters, which have the disadvantage in that undesirable poor image adhesion results with such materials.

Although there are many recording sheets available for use, as known in the art, there remains a need for new recording sheets with coatings thereover that will enable the formation of images with high optical densities, good feedability, low haze and excellent toner or ink adhesion, especially for high speed copiers. In general, toner adhesion problems can be eliminated if one uses similar type of binder resin both for the toner and recording sheet coating, as discussed in EP 0349,227. However, that means the coating for the recording sheets would have to be changed every time a different toner resin is used. Further, some of these toner resins might only be feasible in solvent-based coatings, as in EP 0 349 227.

For the water-based coatings, the backing is usually primed with corona treatment or a coating of polyvinylidene chloride to achieve good adhesion between receptive coating and backing. For all the coatings cited above, antistatic agents are also needed in the receptive coating layer to achieve antistatic properties needed.

SUMMARY OF THE INVENTION

In one aspect of the present invention a transparent recording sheet (also referred to as "recording sheet") is provided comprising a transparent substrate, bearing on at least one major surface thereof, a coating layer of a transparent water-based image-receptive coating composition comprising (1) an oligomer incorporating at least one addition product of at least two reactants wherein one reactant is at least one 3-glycidoxypropylalkoxy silane and the other reactant is at least one secondary hydroxyalkyl amine, and (2) a colloidal dispersion having a pH greater than 7, such that the recording sheet is suitable for use in any electrographic or xerographic plain paper copying device or thermal printers. The transparent recording sheets are useful for projection using an overhead projector and advantageously, do not stain when subsequently annotated with water soluble markers.

More particularly, the present invention provides a transparent recording sheet coated with a transparent water-based image-receptive coating composition comprising:

(a) from about 5 parts by weight to about 95 parts by weight of an oligomer incorporating at least one addition product comprising at two reactants as described above and has the formula:

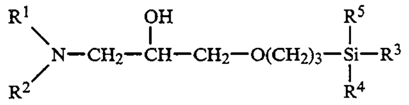

wherein at least one of $R^1$ or $R^2$ is a hydroxyalkyl group having 2–8 carbon atoms, preferably 2–6 carbon atoms, and further $R^1$ and $R^2$ can each be different or the same and include, for example, methyl, ethyl, hydroxy-ethyl, 2- and 3-hydroxpropyl, 2-, 3- and 4-hydroxybutyl, and 2, 3, 4, 5, 6-penta hydroxyhexyl;

$R^3$ is an alkoxy group having 1–4 carbon atoms; and $R^4$ and $R^5$ can each be an alkyl group having 1–4 carbon atoms and/or an alkoxy group having 1 to 4 carbon atoms; and (b) from about 5 parts by weight to 95 parts by weight of a colloidal dispersion having a pH greater than 7.

The image receptive coating composition can be easily coated from an aqueous solution using art known coating techniques onto unprimed polymeric films (transparent substrates) to provide clear coatings and low haze with excellent adhesion to the polymeric film. The coating composition produces a transparent recording sheet imageable using a variety of toners and thermal inks with different binder resins, good image quality and feedability. Advantageously, the use of the coating composition as the receptive layer in the present invention shows extraordinary adhesion to the substrate without any additional priming, which is an improvement over prior art image receptive layers.

A preferred embodiment of a transparent recording sheet of the present invention comprises (1) an image receptive coating composition and (2) an anit-blocking agent having at least one component comprising the following composition:

(a) from about 20 to about 100% by weight of polymerizable diol di(meth)acrylate having the formula:

$$H_2C{=}CR^6COOC_nH_{2n}OOCR^6{=}CH_2$$

wherein $R^6$ is H or $CH_3$ and n is an integer 4 to 18;

(b) about 0 to about 80% by weight of at least one copolymerizable vinyl monomer of the formula:

$$H_2C{-}CR^7COOC_mH_{2m+1}$$

wherein $R^7$ is H or $CH_3$; and m is an integer 12 to 40; and (c) about 0 to about 30% by weight of at least one copolymerizable ethylenically unsaturated monomer selected from the group consisting of vinyl esters, acrylic esters, methacrylic esters, styrene, styrene derivatives, and mixtures thereof.

The anit-blocking agents preferably have an average particle size distribution of from about 0.25 μm to about 15 μm, more preferably a narrow particle size distribution, that is, a size distribution having a standard deviation of up to about 20% of the average particle size.

As used in this application:

"(meth)acrylate" refers to both acrylate and methacrylate and "(meth)acrylic acid" refers to both acrylic acid and methacrylic acid;

"bimodal" means a particle size distribution formed by mixing particles having 2 different particle size distributions;

"co-oligomer" means an oligomer produced by the simultaneous oligomerization of two or more dissimilar alkoxysilanes; and "oligomer" can be used interchangeably with co-oligomer.

DESCRIPTION OF THE PREFERRED EMBODIMENT(S)

The image-receptive coating composition comprises an oligomer comprising at least one addition product of at least two reactants, wherein one reactant is a 3-glycidoxypropylalkoxy silane and a second reactant is at least one secondary hydroxyalkylamine and the addition product has the formula:

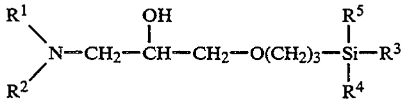

wherein at least one of $R^1$ or $R^2$ is a hydroxyalkyl group having 2–8 carbon atoms, preferably 2–6 carbon atoms, and further $R^1$ and $R^2$ can each be different or the same and include, for example, methyl, ethyl, hydroxy-ethyl, 2- and 3-hydroxpropyl, 2-, 3- and 4-hydroxybutyl, and 2, 3, 4, 5, 6-penta hydroxyhexyl;

$R^3$ is an alkoxy group having 1–4 carbon atoms; and $R^4$ and $R^5$ can each be an alkyl group having 1–4 carbon atoms and/or an alkoxy group having 1 to 4 carbon atoms.

The addition product is formed by the reaction of a secondary hydroxy alkyl amine and a 3-glycidoxypropylalkoxy silane, wherein the reactants are either undiluted or in solution. Furthermore, the addition of small quantities of additional primary or secondary amines different than the secondary amines of the second reactant to the reaction mixture of the addition product can enhance or alter characteristics of a coating composition. For example, the coating compositions thus formed have very good wetting characteristics for transparent substrates and in particular, polyester film surfaces and the use of additional surfactant can either be decreased or eliminated. The additional primary or secondary amines (which tend to be hydrophobic) include dipropylamine, diallylamine, Jeffamine™ T-403 (a trifunctional polyoxyalkyleneamine commercially available from Texaco Chemical). The amount of the additional secondary amines (typically more hydrophobic) can be present up to the amount of the amines used as the second reactant (typically more hydrophilic), e.g., equal amounts of hydrophobic and hydrophilic amines in the reaction mixture. This amount is typically 5 to 20 parts by weight.

Oligomers are provided when the addition product is dissolved in water, wherein it is presumed $R^3$ is hydrolyzed, thereby producing predominately siloxane linkages from the silanols. Advantageously, these oligomers are stable in aqueous solutions.

Prior to the formation of the oligomer, the addition product of above can be mixed with one or more additional silanes, thereby forming co-oligomers. These additional silanes include methyltrimethoxy silane, vinyltrimethoxy silane, dimethyldiethoxy silane, methacryloxypropyl trimethoxy silane, glycidoxypropyltrimethoxy silane, mercaptopropyltrimethoxy silane, chloropropyltrimethoxy silane, bromopropyltrimethoxy silane, iodopropyltrimethoxy silane, chloromethyltrimethoxy silane, other alkylamine addition products of glycidoxypropyl silanes, such as those with dialkylamines and amino-substituted polyalkylene oxides (Jeffamines™ commercially available from Texaco Chemicals) or substituted Jeffamines™, and mixtures thereof. Preferably, useful optional silanes include methyltrimethoxy silane, dimethyldiethoxy silane, methacryloxypropyl trimethoxy silane and addition products of the glycidoxy propyl silanes, and more preferably, include dipropylamine addition products, and amino-substituted polyalkylene oxides.

The oligomers and co-oligomers are stable in aqueous solutions, without gelation or flocculation, even when an additional silane reactant is not, itself, water stable. The presence of these additional silanes in the oligomers tend to lower the coefficient of friction of the image receptive coating layer and reduces the tendency for staining when annotated with water soluble markers. Both of these properties are beneficial to the performance of the transparent recording sheet.

Oligomers or co-oligomers are present in the coating composition from about 5 parts to about 95 parts by weight of solids of the coating composition, preferably from about 25 parts to about 75 parts by weight, and more preferably from about 40 parts to about 60 parts by weight. In the oligomeric blends, the addition products of a 3-glycidoxypropylalkoxy silane and a secondary hydroxyalkyl amine is present from about 30 parts to about 98 parts by weight of the blend, preferably from about 60 parts to about 95 parts by weight of the blend.

An aqueous solution of oligomers or co-oligomers can easily be blended with a colloidal dispersion without destabilization of the colloids to form a particularly useful coating solution. The colloidal dispersions useful in the present invention include colloidal silica particles, such as nanometer-sized silica particles in a basic environment including Nalco colloidal silica (available from Nalco Chemical Company); Ludox colloidal silicas, (commercially available from DuPont); and SnowTex Colloidal Silica (commercially available from Nissan Chemical Industry, Ltd.); colloidal alumina sols, such Dispal™ 23N4–20 (commercially available from Vista Chemicals); and colloidal tin oxide sols, such as Nyacol™ DP5730 (commercially available from Nyacol Products, Inc.). Colloidal particles in the dispersion are present from about 5 parts to 95 parts by weight of the solids of the coating composition, preferably from about 25 parts to 75 parts by weight and more preferably from about 40 parts to 60 parts by weight of the solids. The pH of the colloidal dispersion is greater than 7. The dispersion/oligomer solution can be coated onto at least one major side of a transparent substrate using any art known method of coating, such as, knife coating, roll coating, curtain coating, extrusion coating and the like.

Generally, the image receptive coating composition can be coated directly onto an unprimed transparent substrate, that is, additional primers or priming steps are not required to increase the adhesion of the coating composition to such layers. Coating techniques useful in coating the compositions of the present invention include techniques known to those skilled in the art. Further, there are techniques known to those skilled in the art for priming surfaces prior to coating and include PVDC, corona treatment, and flame treatment.

The transparent substrate can be selected from any transparent polymeric film including polyester, such as polyethylene terephthalate (PET); polysulfones; polycarbonates; polystyrenes; acetates; polyolefins, such as polyethylene and polypropylene; and cellulose acetates, with PET film being preferred because of its thermal and dimensional stability. The caliper of the substrate ranges from about 25 μm to about 200 μm, preferably from about 75 μm to about 150 μm.

Surfactants can be added to the image receptive coating composition to provide enhanced wetting properties. The surfactants, if present, are added to the coating composition after the oligomers are formed, but prior to the coating onto the polymeric film. Preferred surfactants include Triton™ X-100 (commercially available from Union Carbide), and fluorochemical surfactants such as:

$$C_8F_{17}SO_2N(-C_2H_5)(C_2H_4O)_nR$$

wherein n is from about 6 to about 15 and R can be hydrogen or methyl. Useful examples include Fluorad™ FC-1 70C and Fluorad™ FC-1 71 wetting agents (commercially available from 3M). The amount and type of surfactants depends on the specific interfacial interactions of the surfactant and the surface of the transparent substrate.

Advantageously, the coating composition exhibits antistatic properties, generally providing a surface resistivity that is particularly useful for xerographic printing. The surface resistivity generally ranges from about $10^{10}$ Ω/sq. to about $10^{15}$ Ω/sq., with the typical surface resistivity being in the range of $10^{13}$ Ω/sq. When coated with the coating composition, the recording sheet is useful for making transparencies for overhead projectors using copying devices such as xerographic, electrographic and color laser copiers, and printing devices, such as thermal transfer.

The coating composition of the present invention preferably comprises an anti-blocking agent, which improves feedability of the image receptor sheets. The anti-blocking agent can be a single component or a blend of components that tend to decrease the coefficient of friction, lower the tendency of the image receptive layer of sticking to the underside of the previous image receptor, and improve the feeding performance with fewer problems associated with multiple feeding. Nonlimiting examples of anti-blocking agents useful in the present invention include inorganic particles, such as talc, silica, aluminum oxide; and polymeric particles, such as urea formaldehyde, starch, polymethylmethacrylate (PMMA) beads, polyethylene (PE) beads, polytetrafluoroethylene (PTFE) beads and beads comprising homopolymers or copolymers of diol di(meth)acrylates with long chain fatty alcohol esters of (meth)acrylic acid; and combinations thereof. The particles can be regularly or irregularly shaped and preferably, the particles are comprised of the following polymerized composition:

(a) from about 20 to about 100% by weight of polymerizable diol di(meth)acrylate having the formula:

$$H_2C{=}CR^6COOC_nH_{2n}OOCR^6{=}CH_2$$

wherein $R^6$ is H or $CH_3$ and n is an integer 4 to 18;

(b) about 0 to about 80% by weight of at least one copolymerizable vinyl monomer of the formula:

$$H_2C{-}CR^7COOC_mH_{2m+1}$$

wherein $R^7$ is H or $CH_3$; and m is an integer 12 to 40; and (c) about 0 to about 30% by weight of at least one copolymerizable ethylenically unsaturated monomer selected from the group consisting of vinyl esters, acrylic esters, methacrylic esters, styrene, styrene derivatives, and mixtures thereof.

Examples of diol di(meth)acrylates include: 7,4-butanediol di(meth)acrylate, 1,6-hexanediol di(meth)acrylate, 1,8-octanediol di(meth)acrylate, 1,10-decanediol di(meth)acrylate, 1,12-dodecanediol di(-meth)acrylate, 1,14-tetradecanediol di(meth)acrylate and mixtures thereof. Preferred monomers include those selected from the group consisting of 1,4-butanediol di(meth)acrylate, 1,6-hexanediol di(meth)acrylate, 1,12-dodecandediol di(meth)acrylate, 1,14-tetradecanediol di(meth)acrylate, and mixtures thereof. Preferred examples of long chain fatty alcohol esters of (meth)acrylic acid, include lauryl (meth)acrylate, octadecyl (meth)acrylate, stearyl (meth)acrylate, and mixtures thereof.

Ethylenically-unsaturated comonomers can be added to impart higher strength or higher Tg to the resulting copolymeric particles. Examples include vinyl esters such as vinylacetate, vinylpropionate, and vinyl pivalate; acrylic esters such as methylacrylate, cyclohexylacrylate, benzylacrylate, and isobornylacrylate, hydroxybutylacrylat and glycidylacrylate; methacrylic esters, such as methyl methacrylate, butylmethacrylate, cyclohexylmethacrylate, benzylmethacrylate, ethylmethacrylate, γ-methacryloxypropyltrimthoxysilane, and glycidylmethacrylate; α-cmethylstyrenes and styrenes; vinyltoluene and mixtures thereof. Most preferred particles include 50/50 poly(hexanedioldiacrylate/stearyl (meth)acrylate), 50/50 poly(butanedioldiacrylate/lauryl (meth)acrylate), 80/20 poly(hexanedioldiacrylate/-stearyl(meth)acrylate), 50/50 poly(methylmethacrylate/1,6-hexanedioldialacrylate), C14 dioldiacrylate and C12 dioldi(meth)acrylate.

The polymeric particles described above may also optionally contain additives that are not ethylenically unsaturated, but which contain functional groups capable of reacting with the image receptive coating of the present invention.

The polymeric particles are polymerized by means of conventional free-radical polymerization, that is, those suspension polymerization methods are described in U.S. Pat. No. 4,952,650 and U.S. Pat. No. 4,912,009, and such description is incorporated herein by reference, or by suspension polymerization using a surfactant as the suspending agent, and use those initiators normally suitable for free radical initiation of acrylate monomers. Such free radical initiators are oil-soluble and essentially water-insoluble, and include azo compounds such as 2,2'-azobis-2-methylbutyronitrile and 2,2'-azobis (isobutyronitrile); and organic peroxides such as benzoylperoxide and lauroylperoxide.

For improved performance, the mean particle size preferably ranges from about 0.1 μm to about 15 μm. For particles smaller than 0.1 μm, more particles would have to be added to produce the effective coefficient of friction reduction. More particles tend to also produce more haze, which is undesirable for use with an overhead projector. For larger particles greater than 15 μm, thicker coatings would have to be used so as to anchor the particles firmly on the coatings, which would increase haze and add to the total cost of the transparency film. For good feedability, the particles preferably have narrow particle size distributions, that is, a standard deviation of up to about 20% of the average particle size.

Preferred anti-blocking agents are those having a bimodal particles size distribution, for example two size distributions having average particles size diameters of 0.25 μm and 8 μm. When bimodal particles are used, both particles can be selected from the same preferred polymeric beads described above, or one of them can be selected from such preferred beads and one selected from other beads such as PMMA and polyethylene beads, the second type of beads also preferably having a narrow particle size distribution.

Most preferably, both bimodal particles are selected from beads produced form the copolymer of hexandedioldiacrylate and stearylmethacrylate, having particle size distributions of from about 0.2 to about 4 μm and from about 6 to about 10 μm; preferably from about 2 to about 6 μm and from about 8 to about 12 μm; or from about 0.2 to about 0.5 μm and from about 1 to about 6 μm.

In the thermal printing devices, the selection of particles in the image receptive coating is not as critical as in xerographics or electrographic copiers. Useful particles can be selected from other known particles, such as talc, starch, urea formaldehyde, or amorphorus silica, as well as the ones described above. Bimodal particle size distributions are generally not required.

The coating thickness for the transparency films useful for copying devices are typically in the range from about 100 nm to about 1500 nm, preferably from about 200 nm to about 500 nm. If large particles are used, the coating thickness is generally increased accordingly to ensure sufficient coating composition is present to anchor the particles onto the transparent polymeric substrate. On the other hand the coating thickness can be correspondingly thinner when smaller particles are used in the coating composition. The most preferred particle size distributions are more related to the coating thickness rather than the feeding performance of the film. The image receptive coating for thermal printers preferably range in thickness from about 0.15 μm to about 1.5 μm, more preferably from about 0.5 μm to about 1.3 μm.

The transparency sheets used for copying devices typically have low haze, and a low coefficient of friction. Sheets with a haze number of less than about 10 and more preferably less than 5 provide a high quality image when projected on an overhead projector. Low coefficient of friction, especially static friction (as measured by Test Methods described below), is characteristic of good feedability, while a high coefficient of friction indicates a tendency for jamming and multiple feeds problems when stack feeding is employed. Generally, coefficients ranging from 0.2 to 0.55, preferably from 0.2 to 0.4, although coefficients higher than 0.55 provide acceptable feeding even though there is tendency to have more feeding problems than typically desired.

Toner adhesion to the coating composition can be enhanced by adding a compatible low melting thermoplastic polymer, such as sulfonated water dispersible polyesters having low glass transition temperatures, such as those described in U.S. Pat. No. 4,052,368 and commercially available from ICI Chemicals, Eastman Chemical, and 3M, water-dispersed acrylates, such as Rhoplex™ resins (commercially available from Rohm & Haas).

Toner adhesion measurements reflect the adhesion of toner particles to the image receptive coating layer and a measurement of at least about 150 grams, preferably at least about 200 grams is desirable. Generally, when the toner adhesion measurement is less than about 150 grams, the toner tends to come off the imaged area when abraded.

Optionally, the surface characteristics of the coating can be enhanced by further lowering the coefficient of friction and reducing staining with the addition of fluorinated polymers. These polymers include collodial dispersions of polytetrafluoroethylene and hexafluoropropylene in water. The collodial dispersion has particles in sizes ranging from 0.05 to 0.5 μm and are added at a level varying from 0.5% to 10% by weight of the imaging coating composition layer.

Thickening agents added to the coating solution are chosen in such a way that they also aid in the dispersion of anit-blocking agents. Such thickening agents usually are water soluble, compatible with the oligomers and colloidal dispersion and do not cause the colloids to gel or cause haziness in the dried coating. They also affect the lubricity of the film surface without adversely affecting the feedability of the finished product.

Useful thickening agents include derivatives of maleic anhydride copolymers such as reaction product of octadecylamine and amino propyltrimethoxysilane with maleic anhydride methyl vinyl ether (commercially available under the trade designation of "Gantrez" from GAF), or styrene maleic anhydride (commercially available from Monsanto), and reaction of Jeffamine™ M-1000 (commercially available from Texaco) with octadecane maleic anhydrides (commercially available from Gulf Chemical Inc.). The long chain alkyl component of these thickening agents also help reduce the coefficient of friction (COF) and staining of these films when used with marking pens. The preferred thickening agents comprise the reaction the product of the oligomers and Gantrez.

The transparent recording sheet of the present invention is useful in thermal transfer imaging system, and may be produced in a variety of commercial embodiments. In one embodiment, the recording sheet may be coated with the image-receptive coating composition on one side of the substrate, with the other side being coated with an antistatic composition.

Preferred antistatic compositions include perfluoroalkylsulfonamidopolyether derivatives having the following formula:

$$R_fSO_2N(R^8)-(R^9O)_y-R^{10}$$

wherein $R^8$ and $R^{10}$ are independently selected from the group consisting of hydrogen, alkyl, aryl, arylalky, alkyaryl, aminoalkyl, hydroxyalkyl, maleiamide, alkoxy, allyl, and acryoyl, $R^8$ and $R^{10}$ not being identical groups, and at least one of $R^8$ and $R^{10}$ being a vinyl group;

$R^9$ is selected from ethyl and isopropyl groups;

$R_f$ is a perflourinated linear or branched alkyl group containing up to about 30 carbon atoms, said alkyl group containing an extended fluorocarbon chain, said chain both hydrophobic and oleophobic; and y is an integer of 7 to 100.

The image receptor sheet of the present invention can also be used in some thermal printers where a manifold is desired. A manifold comprises a transparent recording sheet of the present invention, and a nontransparent backing sheet having a contact surface in intimate contact with the recording sheet, and an opposing surface. The backing sheet can be paper, plastic or synthetic paper. If plastic or synthetic paper is used, the opposing surface can have a coating comprising a mixture of antistatic agent, a polymeric binder, and a polymeric particulate. Manifolds having such coatings can be stacked fed through a thermal printer which has a multiple sheet feeding device.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent. The following Examples set forth synthetic procedures for the invention, which is clearly set forth above and the procedures, with the selection of the appropriate reagents is believed to be able to enable the synthesis of the generic class of compounds described hereinabove and recited in the claims that follow this description.

EXAMPLES

Test Methods

Coefficient of Friction

The Coefficient of Friction or COF of two stationary contacting bodies is defined as the ratio of the normal force "N", which holds the bodies together and the tangential force "$F_1$", which is applied to one of the bodies such that sliding against each other is induced.

A model SP-102B-3M90 Slip/Peel Tester, from Imass Co. was used to test the COF of articles of the invention. The bead-coated sides of two sheets are brought into contact with each other, with 1 sheet attached to a 1 kg brass sled, tethered to a force gauge and the second sheet attached to the moveable platen. The platen is drawn at a constant speed of 15 cm/min., and the maximum and average COF values are obtained from the tester readout and recorded.

Surface Resistivity

Surface conductivity of the coated film was measured using a Model 240A High Voltage Supply, available from Keithley Instruments, along with a Model 410A Picoammeter and a Model 6105 Resistivity Adapter. The film samples prepared were 8.75 cm×8.75 cm in size and were conditioned by sitting at 23° C. at 50% RH overnight. The surface conductivity is then measured by placing between the 2 capacitor plates and applying a 500 volt charge. The surface conductivity is measured in amperes and reported in resistivity according to the equation:

$$R=(53.4\times 500\ V)/I$$

wherein "I" is the measured amperes.

Toner Adhesion Test

ASTM D2197-86 "Adhesion of Organic Coatings by Scope Adhesion" was used to measure toner adhesion to the coated surface of the film using an IMASS unit (Model No. SP-102B-3M90). The platen is drawn at a constant speed of 30 cm/min. The measurements were done on samples after the coated film was imaged using a variety of commercially available xerographic copiers. The results were recorded in grams, which is the weight applied to the stylus when scratching of the image begins.

Haze

Haze is measured with the Gardner Model XL-211 Hazeguard hazemeter or equivalent instrument. The procedure is set forth in ASTM D 1003-61 (Reapproved 1977). This procedure measures haze of the unprocessed film.

Stack Feeding Test

This test defines the number of failures per 100 sheets fed. Receptor sheets were conditioned in a stack at a temperature of 25° C. at 50% relative humidity overnight prior to feed testing. Any jamming, misfeed, multifeed or other problems during the xerographic copying process was recorded as a failure.

| Glossary | |
|---|---|
| A-39 | sulfonated polyester, prepared according to U.S. Pat. No. 4,052,368 |
| AIBN | azo-bis-isobutyronitrile commercially available under the trade designation of VAZO 64 from DuPont |
| DEA | diethanolamine |
| ED-900 | difunctional polyoxyalkyleneamine commercially available under the trade designation of Jeffamine from Texaco Chemical Co. |
| GPTMS | 3-glycidoxypropyltrimethoxysilane commercially available from Union Carbide under the trade designation A187 and from Huls America, Inc. |
| Nalco 1030 | colloidal silica having an average particle size of 13 nm and 30% solids with a pH of 10.2 commercially available from Nalco Co. |
| SM-30 | colloidal silica commercially available under the trade designation "Ludox" from DuPont |
| T-403 | trifunctional polyoxyalkyleneamine commercially available under the trade designation of Jeffamine from Texaco Chemical Co. |
| TEA | triethanolamine |
| TMSPM | trimethoxysilylpropylmethacrylate |

Preparation Example P1

Preparation Of Anti-Blocking Agent

A. Preparation of DEA-Adipic Acid Condensate Promoter

Equimolar amounts of adipic acid and DEA were heated and stirred in a closed reaction vessel. Dry nitrogen was constantly bubbled through the reaction mixture to remove water vapor, which was condensed and collected in a Barret trap. When about 1.5 moles of water based on 1 mole of adipic acid and 1 mole of DEA had been collected, the reaction was stopped by cooling the mixture. The resulting condensate was diluted with water.

B. An aqueous mixture of 600 grams of deionized water, 10 grams SM-30 colloidal silica, 2.4 grams of 10% solution of DEA-adipic acid condensate promoter and 0.13 g of potassium dichromate was stirred and adjusted to pH 4 by addition of 10% sulfuric acid. Monomer solution of 32 grams of 1,3-butanedioldiacrylate (commercially available from Sartomer), and 0.15 grams of AIBN, were added to 56 grams of the aqueous mixture and then stirred in a Manton-Gaulin homogenizer for 2 minutes at the low speed setting. The mixture was then poured into a glass bottle, which was then purged with nitrogen, sealed and placed in shaker water bath at 70° C. for 20 hours. The contents of the bottle were then collected on a Buchner funnel and washed several times water to yield a wet cake. The wet cake was then dried at ambient temperature to give free flowing powder.

Preparation Example P2

Preparation of Submicron Anti-Blocking Agent

A mixture of 129 grams of 1,6-hexanedioldiacrylate (commercially available from Sartomer), 192 grams of stearylmethacrylate (commercially available from Rohm & Haas), and 1.2 grams of AIBN, was stirred in a beaker until the AIBN was completely dissolved. It was then added to a 2 liter resin flask containing 28.8 grams of "Dehyquart A", a 25% solution of cetyltrimethylammonium chloride (commercially available from Henkel Corp.), and 820 grams of deionized water. The flask was then stirred at 700 rpm for 2 minutes. A coarse emulsion was obtained, which was then passed through a Manton-Gaulin Homogenizer (available from Gaulin Corp.). The emulsion was passed through the homogenizer a total of 2 times. The homogenized emulsion was returned to the resin flask and heated to 60° C. and maintained at this temperature for 15 hours under gentle agitation (400–500 rpm) with a nitrogen blanket. A stable emulsion was obtained at the end of such time, having about 30% submicron polymeric beads. Analysis on the Coulter N4 (available from Coulter Electronics) revealed an average particle size of 0.25 μm.

Preparation Example P3

Preparation of Jeffamine ED-900/FX-8

144 grams of FX-8 fluorocarbon sulfonyl fluoride (commercially available from 3M) was added slowly over a period of at least 1 hour to a mixture of 50 grams of TEA, 135 grams of ED-900, in 100 ml of isopropylether. The mixture was heated to a temperature of 70° C. and refluxed for 5 hours. The mixture changed color from a bright yellow to dark amber during this time. After cooling, the reaction product and isopropylether separated into 2 layers. Adjustment to a pH of 7 was effected by slowly adding a 50/50 by weight of HCL/water to the solution. About 50–75 ml of methylene chloride was then added prior to transfer of the entire solution to a separatory funnel. After twice washing the bottom layer with a 2% HCL solution, each time removing the bottom layer and pouring it into a conical flask containing 150 grams of magnesium sulfate. The product was left to dry for 1 hour, then filtered through a flutted paper funnel. A clear amber-colored liquid was collected. Using a 60°–70° C. water bath, any solvent was rotovaporated and the final product was decoloraized by charcoal.

Preparation Example P4

Preparation of A-39 Sulfonated Polyester

A-39 sulfonated polyester is a water soluble sulfonated polyester with a Tg of 22° C. It was prepared from 8.5 moles of sodium dimethylsulfoisophthalate, 71.5 moles of dimethylterephthalate, 200 moles of ethylene glycol, 20 moles of dimethylisophthalate, and 20 moles polycaprolactonediol (PCP-200 manufactured by Union Carbide) according to the procedure described in U.S. Pat. No. 4,052,368 and such description is incorporated herein by reference.

Example 1

A receptor suitable for use with a copying device was made in the following manner:

A: Preparation of an addition product of DEA and GPTMS 23.6 grams of GPTMS, 10.5 grams of DEA, and 5 grams of isopropanol were placed in a flask and stirred rapidly at room temperature to initiate the reaction. Initially, the reaction was heterogenous, but after about 5 to 10 minutes, a clear, one phase viscous liquid was formed. After the mixture was stirred for about ½ an hour at room temperature, it was then heated in a hot water bath for another ½ hour at 40° to 45° C. After removal from the hot water bath, the liquid was stirred for an additional ½ hour before adding 110 grams of water to the mixture to hydrolyze the methoxy groups. An approximately 20% solid solution of the coupling agent was produced, based on the assumption all methoxy groups were hydrolyzed.

B: Preparation of a Coated Receptor 10 grams of Nalco 1030 having an average particle size of 13 mm, and 30% solids with a pH of 10.2 was diluted with 20 grams of deionized water in a vessel. This was mixed with 20 grams of a 10% solution of the above prepared addition product to give a solution of 3:2 silica:addition product. The resultant mixture was slightly hazy, but no settling or agglomeration was observed even after one year at room temperature. To this mixture was then added 0.5 gram of a 1% solution of Triton X-100 surfactant (available from Union Carbide) and 0.2% of total weight Fluorad TM FC-100 fluorochemical surfactant (available from 3M). After allowing to stand at room temperature for about one hour, it was coated to a 75 mm wet thickness onto unprimed polyethylene terephthlelate (PET) film using a #6 Meyer rod. The coating was then dried for 5 minutes at 110° C. to produce a clear, non-tacky film. The film coating stayed intact when washed with a stream of hot water. The receptor was tested according to the tests described above and the results are shown in Table 1.

Example 2

Preparation of an image receptive transparent film suitable for use in a copying thermal printing device is carried out as follows:

A: Preparation of an addition product of DEA and GPTMS and ED-900/FX-8

354 grams of GPTMS was combined with 150 grams of DEA, and 30 grams of ED-900/FX-8 prepared according to Example P3. 45 grams of methanol was added to the mixture to promote mixing with vigorous stirring. The blend was heated to a temperature of about 40°-50° C. Initially, the blend was not homogenous, and the reaction mixture was hazy. After about 15 minutes, it turned clear. After reacting for about 90 minutes longer at this temperature, 51 grams of methyltrimethoxysilane and 55.5 grams of dimethyldiethoxysilane (both commercially available from Huls America Inc.) were added to the mixture followed by stirring for a another 30 more minutes. 300 grams of water was then added and the reaction was allowed to stand at room temperature for 18 hours. 1725 grams of water was added finally to give an oligmeric solution containing 20% solids, assuming complete hydrolysis of the alkoxysilane groups.

B: Preparation of a Silica Blend (Collidal Dispersion)

700 grams of Nalco 1030 was mixed with 70 grams of a 20% solution of A-39, as prepared according to Example P4. To this was also added 10.5 grams of Teflon TM 30 latex (commercially available from DuPont) to form a silica blend.

C: Preparation of a Thickening Agent Solution 3 grams of octadecylamine (commercially available from Aldrich Chemical), dissolved in 97 grams of acetone at a temperature of about 50° C. was added to a second solution containing 10 grams of Gantrez TM AN-149 (commercially available from GAF) and 90 grams of methylethylketone also at 50° C., and prepared with rapid stirring. The entire mixture was then allowed to cool for an hour before being poured with rapid stirring into a solution of 30 grams of aminopropyltriethoxysilane (commercially available from Aldrich Chemical) in 170 grams of methanol. The solution was allowed to stir for 15 minutes. The solution was prepared just prior to using in the following step.

D: Preparation of the Imaging Receptor 630 grams of the 20% oligomer solution as prepared in Part A was diluted with 2000 grams of water and added with rapid stirring to 87.5 grams of the solution prepared in Part C. The entire amount of the silica blend from Part B was then added, also with rapid stirring. Finally, 6.5 grams of stearylmethacrylate (SMA) beads having a particle size of 4 μm, and 6.5 grams of SMA beads having a particle size of 8 μm were added to the mixture. Using a gravure roll coater, the coating mixture was coated onto a 100 μm PET film, and dried. The coating mixture was dried in two steps inside the oven with zone 1 set at 93° C. and zone 2 set at 149° C. The web remained in each zone for about 12 seconds. The dried coating weight was about 0.26 g/m$^2$.

E: Measurement of Properties

All the properties were measured according to the test methods described and the results are listed in Table 1. A 3.7% haze was measured. This example was also printed on a Calcomp Plotmaster thermal mass printer (Model #59025).

Example 3

This was made in a similar manner as Example 2, except 5 parts of a 3:2 mixture of hexafluoropropylene:-vinylidene fluoride per 100 parts of total coating solids was used in place of the Teflon TM latex, and no thickening agents and no polymeric particles were employed. This was tested according to the test methods described above and the results are reported in Table 1.

Example 4

This was made in the same manner as Example 3, except that the co-oligomer was prepared by adding 11.25 grams T403 and 135.0 grams DEA to GPTMS. No anti-blocking agent was added to the coating solution. This was tested according to above and the results are shown in Table 1.

Examples 5–7

These were made using the coating compositions as prepared in Example 4, except that an anti-blocking agent was a plurality of polystyrene beads having an average particle size of 15 μm added in the amount of 0.1, 0.2, and 0.3 parts per 100 parts of the coating solids, respectively. These were also tested according to the test methods as above and the results are reported in Table 1.

Example 8

This was made in the same manner as Example 4, except that Polyflo Wax (a combination of polyethylene wax and polytetrafluoroethylene) was used in the amount of 1 parts per 100 parts of total solids was used. The test results are summarized in Table 1.

Examples 9–10

These were made in the same manner as Example 2, except that no thickening agents were present in Example 9. In Example 10, Teflon TM and A-39 were replaced with 10 parts of Fluorad TM FC-171 sulfonated fluorocarbon (available from 3M). These were tested and the results are summarized in Table 1.

TABLE 1

| Example | Surface Resistivity (Ω/sq) ($10^{11}$) | COF | Toner Adhesion (g) (Xerox 5065) |
|---|---|---|---|
| 1 | 3.4 | >1.0 | 800+ |
| 2 | 12 | 0.57 | 570 |
| 3 | 2.4 | 0.47 | — |
| 4 | 4.9 | 0.48 | 1400 |
| 5 | — | 0.54 | 1150 |
| 6 | — | 0.56 | 1250 |
| 7 | — | 0.50 | 1350 |
| 8 | 8.6 | 0.41 | 850 |
| 9 | 3.4 | 0.53 | 1100 |
| 10 | 2.8 | 0.45 | 950 |

Example 11 and Comparative Example 12C

These were carried out to demonstrate the effect of using different amounts of A-39. The examples were made in procedure described in Example 2, except that 10 parts and 20 parts, respectively, of A-39 were used. The receptor sheets were tested and the results are summarized in Table 2.

TABLE 2

| Example | Haze (%) | Surface Resistivity (Ω/sq) ($10^{11}$) | COF | Toner Adhesion (g) (Xerox 5065) |
|---|---|---|---|---|
| 11 | 3.3 | 9.2 | 0.41 | 1150 |
| 12-C | 13.6 | 8.6 | 0.34 | 950 |

Examples 13–16

These samples were prepared according to Example 2, except different types and amounts of anti-blocking agents, and different amounts of Telfon TM latex were used. The examples are summarized in Table 3. Tests were carried out in the same manner as described in Example 2 and the results are summarized in Table 4. Example 14 had one feeding failure out of 100 attempts.

TABLE 3

| Example | Teflon TM latex (grams) | Toner Adhesion (gm) Xerox 5065 | 8 μm dia. beads (7 grams) | 4 μm dia. beads (7 grams) |
|---|---|---|---|---|
| 13 | 10.5 | 573 | SMA | SMA |
| 14 | 21.0 | 495 | SMA | SMA |
| 15 | 10.5 | 440 | PMMA | SMA |
| 16 | 21.0 | 412 | PMMA | SMA |

TABLE 4

| Example | Haze (%) | Surface Resistivity (Ω/sq) ($10^{11}$) | COF |
|---|---|---|---|
| 13 | 3.7 | 12 | 0.33 |
| 14 | 3.7 | 12 | 0.35 |
| 15 | 3.6 | 13 | 0.38 |
| 16 | 3.2 | 5.3 | 0.41 |

Examples 17

This example was prepared in the following manner:

A: Preparation of the addition product of DEA and GPTMS

The procedure described in Example 1 was used to prepared the addition product.

B: Preparation of a Coated Image Receptor 20 grams of Nalco 1030 was diluted with 40 grams of deionized water in a vessel. This was mixed with 40 grams of a 10% solution of the addition product of Part A to give a solution of 3:2 silica:addition product. To this mixture was then added 3 grams of Teflon TM latex (852-202 PTFE available from Dupont), 3 grams of PMMA particles, 0.5 gram of talc (Minoare L-1 available from Nippon Chemicals), 0.2 grams of FC-99 (Fluorad TM FC-99, available from 3M Co.). After allowing to stand at room temperature for about one hour, it was coated in the same manner as Example 1 and tested using Xerox 1038 and 5065, respectively according to the tests described above. The results are summarized in Tables 5A and 5B.

TABLE 5A

| | Xerox 1038 (RT) | Xerox 1038 (100° F./80% RH) | Xerox 5065 (RT) |
|---|---|---|---|
| % Feeding Failure | 1.4% (4/294) | 0% (0/197) | 0% (0/200) |
| % Toner Adhesion | 870 (3) grams | 300 (4) grams | — |

TABLE 5B

| | | |
|---|---|---|
| % Haze | 2.9 | — |
| % Heat Shrink | 1.1 | — |
| Surface Conductivity | 4E-7 (Side 1) | 7E-7 (Side 2) |
| COF | 0.33 | — |
| Bekk Smoothness | 757 sec (Side 1) | 785 sec (Side 2) |
| Coating Adhesion | Pass | — |

Example 18

Preparation of an image receptor transparent film suitable for use in a copying device was carried out as follows:

A: Preparation of an addition product of DEA, GPTMS and TMSPM

The addition product was prepared according to Example 2, step A, except ED-900/FX-8 was not added and 90 grams TMSPM was added in place of mimethyldiethoxysilane and methyltrimethoxysilane. Water was added to give a 20% solution.

B: Preparation of a Silica Blend Colloidal Dispersion

To 10 grams of Nalco 1030 was added 2.0 grams of a 20% solution of AQ-38 (sulfonated polyester available from Kodak) to form a silica blend.

C: Preparation of an Imaging Receptor 8 grams of the 20% co-oligomer solution prepared in Step A was diluted with 30 grams of water. The entire amount of the silica blend from Step B was then added, with rapid stirring. 15 grams of a bimodal SMA particles (weight ratio of 0.25 μm to 8 μm particles of 1:5) was added to the mixture. Using a knife coater, the coating mixture was coated onto an air-corona treated 100 μm PET film and dried at ~130° C. for 5 minutes to obtain a final dried coating weight of 0.2 g/$m^2$.

D: Measurement of Properties

The sample was imaged with a Xerox 5065 copier and tested according to the tests described above. The results are summarized in Table 7.

Example 19

An image receptor was prepared and tested as described in Example 18, except TMSPM was replaced with 135 grams of vinyltriethoxysilane in the co-oligomer. The test results are summarized in Table 7.

Examples 20–21

Image receptors were made and tested as described in Example 19, except with varying amounts of several kinds of colloidal silica particles, as summarized in Table 6. The test results are summarized in Table 7.

TABLE 6

| Example | Colloidal Silica Type | Amt of Colloidal Silica (grams) |
|---|---|---|
| 20 | Nalco 1115 | 15 |
| 21 | Snowtex UP | 10 |

Example 22

This was made in the following manner:

A: Preparation of an addition product of DEA and GPTMS

The addition product was prepared according to Example 1, step A.

B: Preparation of a coated receptor 15 grams of Nalco 1115 colloidal silica was mixed with 2 grams of a 20% solution of AQ-38 (available from Eastman Kodak) to form a silica blend. This blend was then mixed with 2 grams of 10% solution from Step A (oligomer) and 6 grams of water. To this was then added 15 grams of bimodal SMA particles (at a weight ratio of 0.25 μm to 8 μm particles of 1:5) and 25 grams of a 0.4% solid solution in water of Gantrez -ODA-APS. This is 0.4% solution of the polymer described in Example 2, part C. Using a knife coater, the coating mixture was coated onto an air-corona treated 100/μm PET film and dried at ~130° C. for 5 minutes to obtain a final dried coating weight of 0.2 g/m².

C: Measurement of Properties

The samples was imaged with a Xerox 5065 copier and tested according to the tests described above. The results are summarized in Table 7.

Example 23

An image receptor was prepared according to Example 22 using 7 grams of oligomer rather than 2 grams and 25.6 grams of Gantrez-ODA-APS instead of 25 grams. 0.32 gram of A1110 organosiloxane (supplied by Union Carbide) was added to the coating composition. The sample was tested in manner described in Example 22 and the results are summarized in Table 7.

Example 24

An image receptor was prepared according to Example 22 using 10 grams of Nalco 1030, 6 grams of oligomer, 31.5 grams of Gantrez-ODA-APS, and 0.5 gram A 1120 organosiloxane (supplied by Union Carbide). The sample was tested in a manner as described Example 22 and the results are summarized in Table 7.

TABLE 7

| Example | Post Copy Haze (%) | Toner Adhesion (g) Xerox 5065 | COF | Surface Resistivity (Ω/sq) |
|---|---|---|---|---|
| 18 | 4.1 | >1160 | 0.34 | 7.2E10 |
| 19 | 4.7 | >1160 | 0.37 | 1.6E11 |
| 20 | 10.8 | >1160 | 0.39 | 7.8E11 |
| 21 | 4.7 | >1160 | 0.32 | 1E11 |
| 22 | 12.7 | 670 | 0.37 | 7.4E10 |
| 23 | 12.0 | 1080 | 0.38 | 2.7E11 |
| 24 | 5.6 | >1160 | 0.39 | 1.8E11 |

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A transparent recording sheet coated with a transparent water-based image-receptive coating composition coated onto at least one major surface of a transparent substrate wherein the coating composition comprises:

(1) from about 5 parts by weight to about 95 parts by weight of an oligomer comprising at least one addition product of at least two reactants wherein one reactant is 3-glycidoxypropylalkoxysilane and the second reactant is at least one secondary amine and the addition product has the formula:

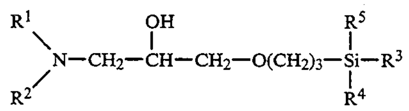

wherein at least one of $R^1$ or $R^2$ is a hydroxyalkyl group having 2–8 carbon atoms, and further $R^1$ and $R^2$ can each be different or the same;

$R^3$ is an alkoxy group having 1–4 carbon atoms; and $R^4$ and $R^5$ can each be an alkyl group having 1–4 carbon atoms and/or an alkoxy group having 1 to 4 carbon atoms; and (b) from about 5 parts by weight to 95 parts by weight of a colloidal dispersion having a pH greater than 7.

2. The transparent recording sheet according to claim 1 further comprising at least one anti-blocking agent comprising either inorganic particles or organic polymeric particles.

3. The transparent recording sheet according to claim 2 wherein the organic polymeric particles are selected from the group consisting of urea formaldehyde, polymethylmethacrylate beads, polyethylene beads, polytetrafluoroethylene beads, and polymeric beads comprising homopolymers or copolymers of diol di(methyl)acrylates with long chain fatty alcohol esters of (meth)acrylic acid.

4. The transparent recording sheet according to claim 3 wherein the organic polymeric particles comprise:

(a) from about 20 to about 100% by weight of polymerizable diol di(meth)acrylate having the formula:

$H_2C{=}CR^6COOC_nH_{2n}OOCR^6{=}CH_2$ wherein $R^6$ is H or $CH_3$ and n is an integer 4 to 18;

(b) about 0 to about 80% by weight of at least one copolymerizable vinyl monomer of the formula:

$H_2C{-}CR^7COOC_mH_{2m+1}$ wherein $R^7$ is H or $CH_3$; and m is an integer 12 to 40; and (c) about 0 to about 30% by weight of at least one copolymerizable ethylenically unsaturated monomer selected from the group consisting of vinyl esters, acrylic esters, methacrylic esters, styrene, styrene derivatives, and mixtures thereof.

5. The transparent recording sheet according to claim 2 wherein the inorganic particles are selected from the group consisting of silica, aluminum oxide and talc.

6. The transparent recording sheet according to claim 2 wherein the oligomer further comprises at least one alkoxylsilane different than 3-glycidoxypropylalkoxysilane.

7. The transparent recording sheet according to claim 6 wherein the alkoxysilane is selected from the group consisting of methyltrimethyoxysilane, dimethyldiethoxysilane, methacryloxypropyltrimethoxysilane and addition products of dialkylamine and glycidoxypropylalkoxysilanes.

8. The transparent recording sheet according to claim 1 wherein the colloidal dispersion is comprised of colloidal silica.

9. The transparent recording sheet according to claim 1 wherein the coating composition further comprises a surfactant.

10. The transparent recording sheet according to claim 1 wherein the addition product further comprises a secondary amine different than the secondary amine used as the second reactant.

11. The transparent recording sheet according to claim 1 wherein the surface resistivity of the coating composition ranges from about $10^{10}$ Ω/sq. to about $10^{15}$ Ω/sq.

12. The transparent recording sheet according to claim 1 wherein the coating composition further comprises a compatible low melting thermoplastic polymer.

13. The transparent recording sheet according to claim 12 wherein the compatible low melting thermoplastic polymer is a sulfonated water dispersible polyester.

14. The transparent recording sheet according to claim 1 wherein the coating composition further includes a collodial dispersion of polytetrafluoroethylene or hexafluoropropylene in water.

15. The transparent recording sheet according to claim 1 wherein the coating composition further includes a thickening agent.

16. The transparent recording sheet according to claim 1 wherein the surface of the transparent substrate opposite the surface coated with the coating composition is coated with an antistatic composition, wherein the antistatic composition comprises:

a perfluoroalkylsulfonamidopolyether derivative having the formula:

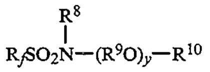

wherein $R^8$ and $R^{10}$ are independently selected from the group consisting of hydrogen, alkyl, aryl, arylalky, alkyaryl, aminoalkyl, hydroxyalkyl, maleiamide, alkoxy, allyl, and acryoyl, $R^8$ and $R^{10}$ not being identical groups, and at least one of $R^8$ and R 10 being a vinyl group;

$R^9$ is selected from ethyl and isopropyl groups;

$R_f$ is a perflourinated linear or branched alkyl group containing up to about 30 carbon atoms, the alkyl group containing an extended fluorocarbon chain, the chain being both hydrophobic and oleophobic; and y is an integer of 7 to 100.

* * * * *